(12) United States Patent
Miura (10) Patent No.: US 7,484,839 B2
(45) Date of Patent: Feb. 3, 2009

(54) DROPLET EJECTION APPARATUS AND DROPLET EJECTION HEAD

(75) Inventor: Hirotsuna Miura, Fujimi (JP)

(73) Assignee: Seiko Epson Corporation (JP)

( * ) Notice: Subject to any disclaimer, the term of this patent is extended or adjusted under 35 U.S.C. 154(b) by 335 days.

(21) Appl. No.: 11/366,718

(22) Filed: Mar. 2, 2006

(65) Prior Publication Data

US 2006/0203063 A1    Sep. 14, 2006

(30) Foreign Application Priority Data

Mar. 10, 2005  (JP) .............................. 2005-067789

(51) Int. Cl.
  *B41J 2/01*   (2006.01)
  *B41J 2/15*   (2006.01)
  *B41J 2/135*  (2006.01)
  *B41J 2/05*   (2006.01)

(52) U.S. Cl. ........................ 347/102; 347/21; 347/44; 347/65

(58) Field of Classification Search ................. 347/102, 347/8, 107, 21, 44, 65; 101/488; 219/216; 346/25; 399/320
See application file for complete search history.

(56) References Cited

U.S. PATENT DOCUMENTS

| | | | | |
|---|---|---|---|---|
| 4,286,839 A | * | 9/1981 | Ilzig et al. | 362/552 |
| 5,305,731 A | * | 4/1994 | Buchholtz | 601/4 |
| 5,625,496 A | * | 4/1997 | Akiyama et al. | 359/666 |
| 6,369,954 B1 | * | 4/2002 | Berge et al. | 359/666 |
| 7,201,318 B2 | * | 4/2007 | Craen et al. | 235/454 |
| 2004/0189750 A1 | | 9/2004 | Miura et al. | |
| 2004/0201646 A1 | | 10/2004 | Sohn et al. | |
| 2006/0203063 A1 | | 9/2006 | Miura | |

FOREIGN PATENT DOCUMENTS

| | | |
|---|---|---|
| JP | 11-077340 | 3/1999 |
| JP | 2003-094181 | 4/2003 |
| JP | 2003-127537 | 5/2003 |
| JP | 2004-276591 | 10/2004 |
| JP | 2005-022097 | 1/2005 |
| JP | 2005-095849 | 4/2005 |
| JP | 2007029980 A * | 2/2007 |
| KR | 10-2004-0065107 | 8/2004 |
| KR | 10-2004-0067905 | 8/2004 |

OTHER PUBLICATIONS

Communication from Korean Patent Office regarding corresponding application.

* cited by examiner

*Primary Examiner*—Stephen D Meier
*Assistant Examiner*—Leonard S Liang
(74) *Attorney, Agent, or Firm*—Harness, Dickey & Pierce, P.L.C.

(57) ABSTRACT

A moving distance is determined based on the time required by a deposited fine droplet to reach a target dot diameter and the velocity at which a movable stage is moved. An aperture is located at a position spaced from a nozzle, which ejects a droplet, by a distance equal to the moving distance. A light-transmissive liquid filling the aperture functions as a liquid lens for focusing a laser beam on a blot of a droplet. The light-transmissive liquid discharged from the aperture is used to clean a nozzle surface of an ejection head.

16 Claims, 6 Drawing Sheets

DROPLET EJECTION APPARATUS AND DROPLET EJECTION HEAD

CROSS-REFERENCE TO RELATED APPLICATIONS

This application is based upon and claims the benefit of priority from prior Japanese Patent Application No. 2005-67789, filed on Mar. 10, 2005, the entire contents of which are incorporated herein by reference.

BACKGROUND

The present invention relates to a droplet ejection apparatus and a droplet ejection head.

An electro-optic device, such as a liquid crystal display (LCD) device or an organic electroluminescence display device, normally includes a transparent glass substrate for displaying an image. An identification code (e.g., a two-dimensional code), which represents manufacturing information including for example a manufacturer or a product number, is marked on the substrate, and is used for quality management or manufacturing management of the electro-optic device. The identification code is formed by using an array of a plurality of pattern formation regions (cells). Some cells include code patterns (e.g., colored thin films or recessions), and other cells do not include code patterns. The manufacturing information is coded by including and excluding the code patterns from the cells.

As methods for forming the identification code, a laser sputtering method and a water jet method have been proposed (JP-A-11-77340 and JP-A-2003-127537). With the laser sputtering method, a metal foil is irradiated with a laser beam and sputtered to form the code patterns. With the water jet method, a jet of water containing abrasive material is ejected against a substrate to inscribe the substrate with the code patterns.

To obtain a code pattern of a desired size with the laser sputtering method, the distance between the metal foil and the substrate must be extremely short (e.g., less than 100 μm). Further, the surfaces of the substrate and the metal foil require flatness with high accuracy. This limits the kinds of substrates that can be used to form the identification codes. For this reason, the laser sputtering method has low versatility. With the water jet method, water, dust, and abrasive agent contaminate the substrate when the substrate is inscribed with the code patterns.

An inkjet method is recently receiving attention as a method to solve the above problems of the laser sputtering method and the water jet method. With the inkjet method, a functional liquid, in which metal particles are dispersed, is ejected as fine droplets onto a substrate, and the droplets on the substrate are dried to form the code patterns on the substrate. This method increases the kinds of substrates that can be used to form an identification code and avoids contamination of the substrate.

With the inkjet method, the code patterns are formed by drying blots of wet fine droplets that are deposited on or adhered to the substrate. This results in the problems that will now be discussed.

A blot of a fine droplet may spread out of a cell. A code pattern that includes a blot spread out from a cell may result in erroneous reading of the substrate information or disable the reading of substrate information.

This problem may be eliminated by irradiating blots of fine droplets with a laser beam to instantaneously dry the blots of the fine droplets. However, referring to FIG. 11, fine droplets Fb are ejected from an ejection head 90, which normally includes a passage 91 for a functional liquid F, a cavity 92 for storing the functional liquid F, and a pressurizing unit 93 for pressurizing the functional liquid F stored in the cavity 92. The layout and processing limitations limit the arrangement of a nozzle 94, which ejects a fine droplet Fb, to the middle portion of the ejection head 90.

Figure 11:
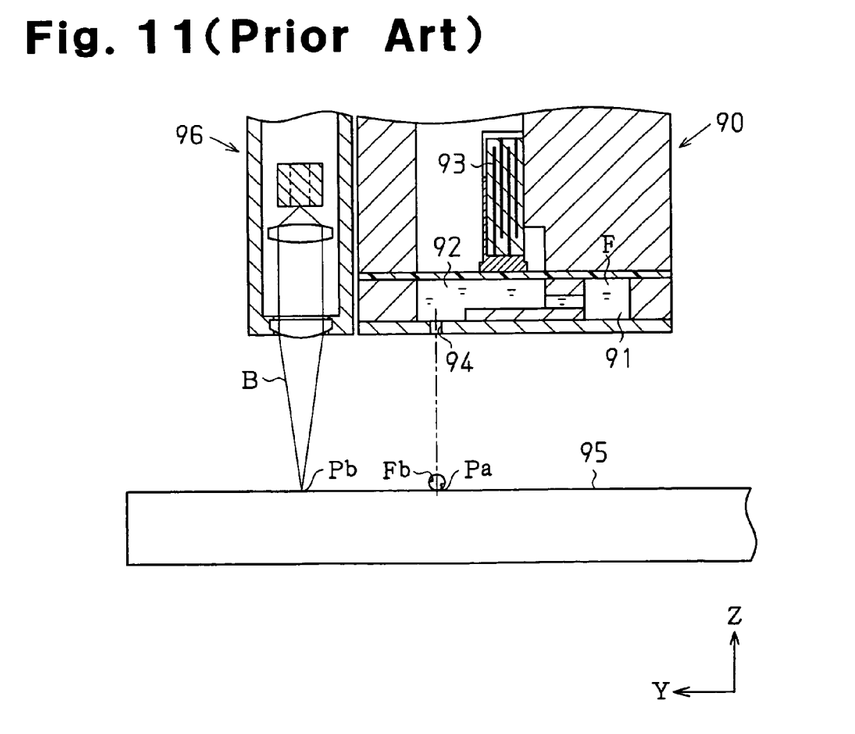
FIG. 11 is a partial cross-sectional view of an ejection head in the prior art.

More specifically, the position at which the fine droplet Fb is deposited (deposit position Pa) becomes farther from the position irradiated by a laser head 96 with a laser beam B (irradiation position Pb) as the nozzle 94 becomes closer to the middle of the ejection head 90. This delays the timing at which the fine droplet Fb is irradiated with the laser beam B by the time taken to move the fine droplet Fb, which is deposited at the deposit position Pa, to the irradiation position Pb. Thus, the drying of the fine droplet Fb is delayed, and the blot of the fine droplet Fb spreads out too much.

The timing at which the laser beam B is emitted may be expedited by emitting the laser beam B through a gap between a substrate 95 and the ejection head 90. However, the distance between the ejection head 90 and the substrate 95 is normally controlled to be in the order of millimeters to ensure the accuracy of the deposit position Pa. Thus, to emit the laser beam B to the blot of the fine droplet Fb through such a gap, the laser beam B needs to be emitted at an extremely acute angle. This may lower the accuracy of the irradiation position Pb, and may cause defective drying of the fine droplet Fb.

SUMMARY

To solve the above problems, it is an object of the present invention to provide a droplet ejection apparatus and a droplet ejection head that expedite the timing at which a deposited droplet is dried and appropriately control the size of a blot of the droplet.

According to a first aspect of the invention, there is provided a droplet ejection apparatus for ejecting a droplet toward a substrate. The droplet ejection apparatus is provided with a droplet ejection head facing towards the substrate and including a nozzle for ejecting the droplet. A laser source generates a laser beam used to irradiate a blot of the droplet deposited on the substrate. An aperture is formed adjacent to the nozzle in the droplet ejection head. A passage, arranged in the droplet ejection head, accommodates a light-transmissive liquid that transmits the laser beam and guides the laser beam to the aperture.

According to a second aspect of the invention, there is provided a droplet ejection head for use with a substrate and a laser beam. The droplet ejection head includes a nozzle for ejecting a droplet toward the substrate. An aperture arranged near the nozzle in which the laser beam is emitted through the aperture to dry a blot of the droplet deposited on the substrate.

According to a third aspect of the invention, there is provided a droplet ejection apparatus for ejecting a droplet toward a substrate. The droplet ejection apparatus includes a laser source for generating a laser beam. A head has a surface facing the substrate. The surface includes a nozzle for ejecting the droplet and a laser aperture aligned with the nozzle. A passage, defined in the droplet ejection head in communication with the laser aperture, supplies a light-transmissive liquid to the laser aperture. Some of the light-transmissive liquid fills the laser aperture and forms a liquid lens. The liquid lens focuses the laser beam on a blot of the droplet deposited on the substrate. A pump applies controlled pressure to the light-transmissive liquid so that the light-transmissive liquid is discharged from the laser aperture.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF EXEMPLARY EMBODIMENTS

A droplet ejection apparatus and a droplet ejection head according to a preferred embodiment of the present invention will now be described with reference to FIGS. 1 to 10.

First, a display module of a liquid crystal display (LCD) device having an identification code that is formed using the droplet ejection apparatus of the present invention will be described.

Figure 1:
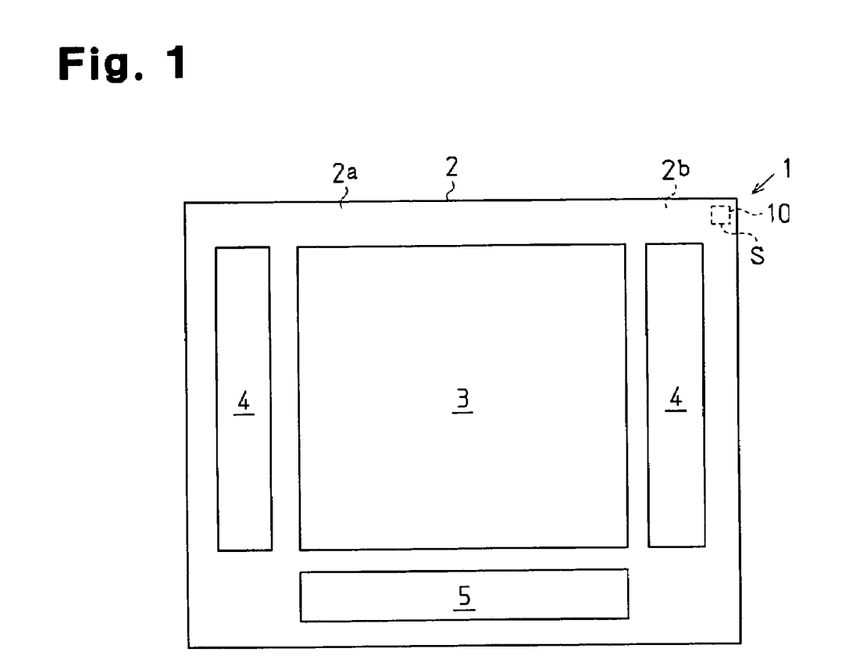
FIG. 1 is a front view of an LCD module.

In FIG. 1, an LCD module 1 includes a transparent glass substrate 2 that transmits light. A rectangular display region 3, in which liquid crystal molecules are enclosed, is the generally middle portion of a surface 2a of the substrate 2. A scan line drive circuit 4 for generating a scan signal and a data line drive circuit 5 for generating a data signal are arranged outside the display region 3. The LCD module 1 controls the orientation of the liquid crystal molecules in accordance with a scan signal provided from the scan line drive circuit 4 and a data signal provided from the data line drive circuit 5. Further, the LCD module 1 modulates flat light emitted from an illumination apparatus (not shown) and displays a desired image on the display region 3.

Figure 2:
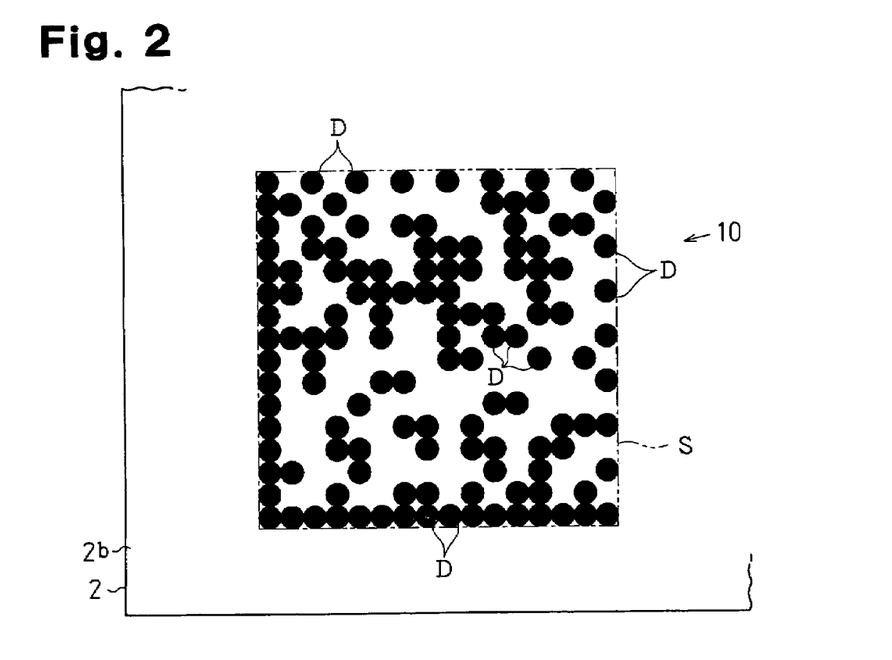
FIG. 2 is a partially enlarged view of FIG. 1 and shows an identification code.

An identification code 10 of the LCD module 1 is formed on a rear surface 2b of the substrate 2 at one corner. The identification code 10 represents, for example, a product number or a lot number of the LCD module 1. As shown in FIG. 2, the identification code 10 is formed in a code formation region S and has a pattern defined by a plurality of dots D.

Figure 4:
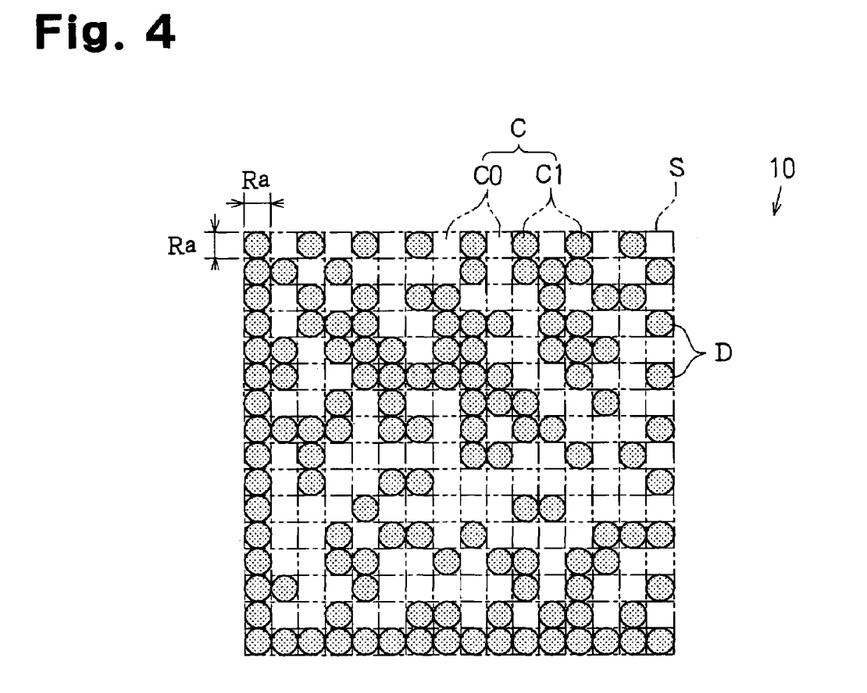
FIG. 4 is an explanatory diagram showing the dimension of each dot that forms the identification code shown in FIG. 2.

As shown in FIG. 4, the code formation region S has 256 cells (divided regions) C in an array of sixteen rows and sixteen columns. In one example, the code formation region S is a 2.24 mm square, and each cell C is a 140 µm square. A dot D is formed in each cell C that is selected in accordance with the identification code 10.

In the preferred embodiment, the diameter of a target dot, or target dot diameter Ra, is equal to the length of one side of a cell C. Hereafter, a cell C in which a dot D is formed is referred to as a black cell C1 and a cell C in which a dot D is not formed is referred to as a white cell C0. Sequentially from the top, the cells in FIG. 4 are referred to as the cells C of the first row, the cells C of the second row, etc., and the cells C of the sixteenth row. Sequentially from the left, the cells C are referred to as the cells C of the first column, the cells C of the second column, etc., and the cells C of the sixteenth column.

Figure 3:
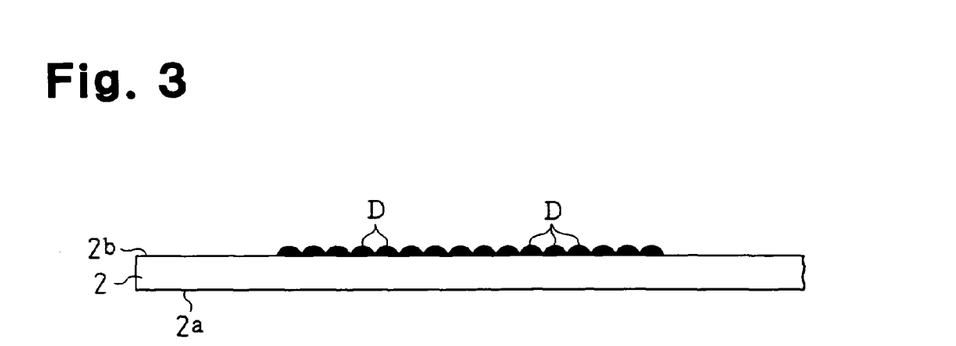
FIG. 3 is a side view of the identification code shown in FIG. 2.

As shown in FIGS. 2 and 3, each black cell C1 includes a semispherical dot D that is in contact with the substrate 2. Each dot D is formed through the inkjet method. In detail, fine droplets Fb containing a pattern formation material (e.g., metal particles such as nickel particles) are ejected from ejection nozzles N of a droplet ejection apparatus 20 (refer to FIG. 5). The fine droplets Fb deposited on the cells C are dried to sinter the metal particles contained in the fine droplets Fb and form the dot D in each black cell C1. The drying and sintering of the fine droplets Fb is enabled by irradiating the fine droplets Fb with a laser beam B (refer to FIG. 8).

Figure 5:
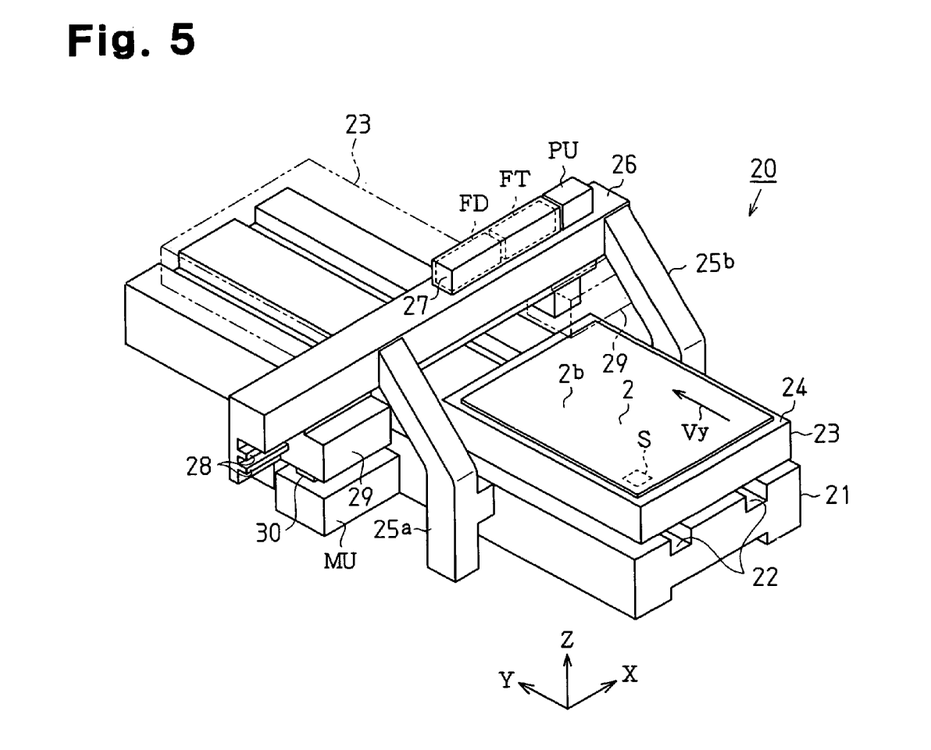
FIG. 5 is a perspective view showing a droplet ejection apparatus according to a preferred embodiment of the present invention.

The droplet ejection apparatus 20 for forming the identification code 10 will now be described. As shown in FIG. 5, the droplet ejection apparatus 20 includes a base 21. The base 21 has a long side extending along the Y axis and a short side extending along the X axis.

Two guide grooves 22 are formed along the Y axis on the top surface of the base 21. A movable stage 23, which is moved linearly along the two guide grooves 22, is mounted on the base 21. The movable stage 23 has a screw shaft (drive shaft) that extends, for example, parallel to the guide grooves 22, and a linear-motion mechanism including a ball nut mated with the screw shaft. A Y axis motor MY (refer to FIG. 9), which is a stepping motor connected to the drive shaft axis, is arranged on the base 21 or the movable stage 23. When a drive signal corresponding to a predetermined quantity of steps is input to the Y axis motor MY, the Y axis motor MY generates forward or reverse rotation so as to move the movable stage 23 forward or rearward at a predetermined velocity along the Y axis by a distance corresponding to the quantity of steps.

The movable stage 23 is moved between a first position indicated by solid lines in FIG. 5 and a second position indicated by broken lines in FIG. 5. The velocity at which the movable stage 23 is moved is referred to as a droplet transfer velocity Vy. In one example, the droplet transfer velocity Vy is set at 200 millimeters per seconds.

The top surface of the movable stage 23 defines a support surface 24. An attraction type substrate chuck mechanism (not shown) is arranged on the support surface 24. The substrate 2 is placed on the support surface 24 with its rear surface 2b (code formation region S) being oriented upward. The substrate chuck holds the substrate 2 at a predetermined position of the support surface 24.

A guide bridge 26 that extends along the X axis is supported by two support legs 25a and 25b. The guide bridge 26 has an end extending from the support leg 25a.

A maintenance unit MU is arranged below the extending end of the guide bridge 26. The maintenance unit MU includes a wiping member (not shown) for wiping and cleaning a nozzle surface 31a (refer to FIG. 6) of an ejection head 30.

A liquid tank 27 is arranged on the top surface of the guide bridge 26. The liquid tank 27 includes a chamber for accommodating functional liquid FD and a chamber for accommodating light-transmissive liquid FT. In the preferred embodiment, the functional liquid FD is a mixture of the metal particles and a dispersion medium that is lyophilic to the rear surface 2b of the substrate 2.

The light-transmissive liquid FT is a liquid compatible with the functional liquid FD and transmits the laser beam B. The light-transmissive liquid FT wets the entire nozzle surface 31a and removes metal particles adhered near the nozzles N when the wiping member wipes the nozzle surface 31a to clean the ejections nozzles N. Therefore, the light-transmissive liquid FT functions as a cleaning liquid. In the preferred embodiment, the light-transmissive liquid FT is n-decane. The light-transmissive liquid FT, which transmits the laser beam B, may be a cleaning liquid selected in accordance with the functional liquid FD.

The functional liquid FD and the light-transmissive liquid FT are supplied from the liquid tank 27 to the ejection head 30 in a manner that the two liquids do not mix with each other.

Figure 9:
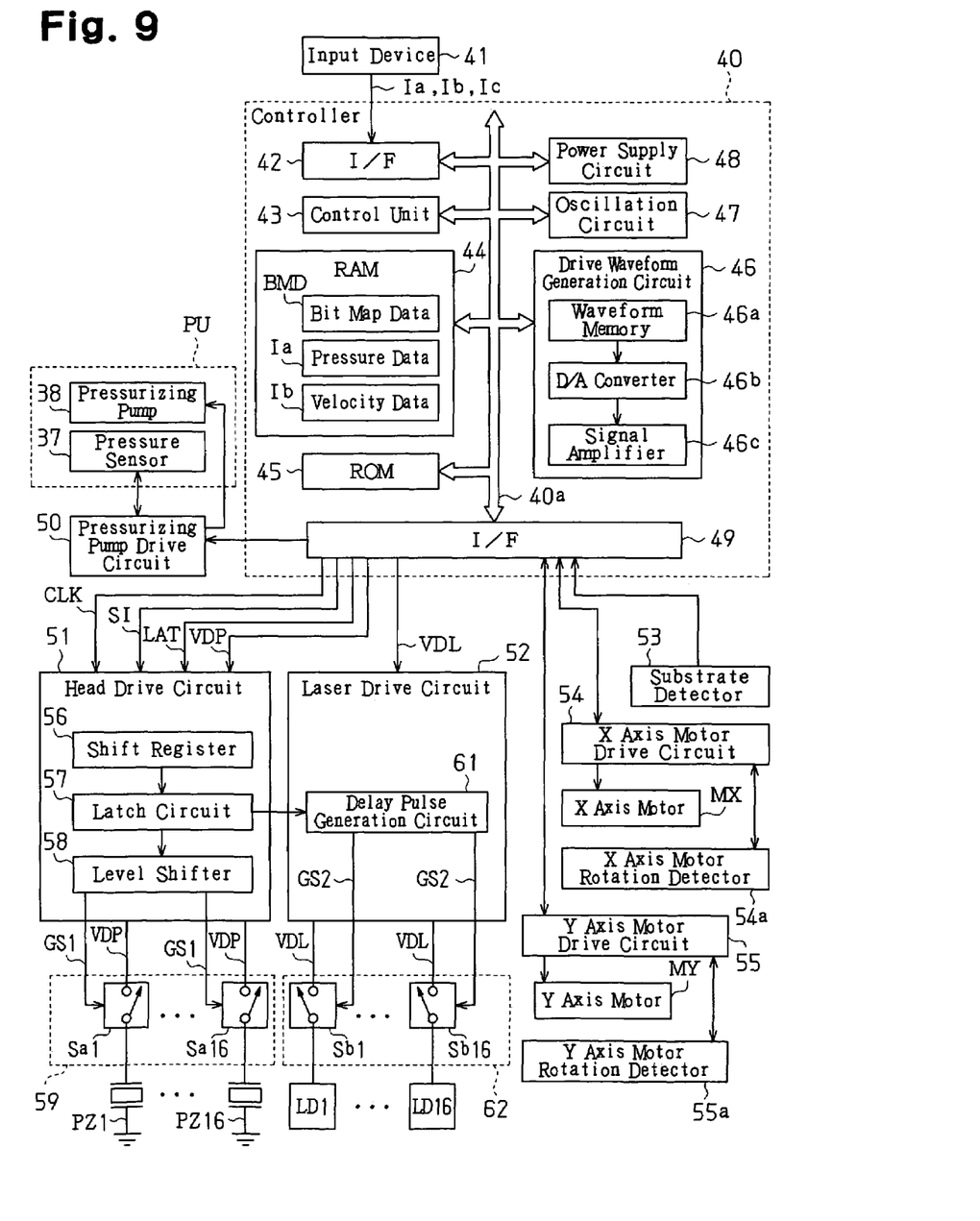
FIG. 9 is a block diagram of the droplet ejection apparatus shown in FIG. 5.

A pressurizing unit PU is arranged adjacent to the liquid tank 27 near the support leg 25b. As shown in FIG. 9, the pressurizing unit PU includes a pressure sensor 37 and a pressurizing pump 38. The pressure sensor 37 detects the pressure of the light-transmissive liquid FT in the liquid tank 27. The pressurizing pump 38 functions as a lens formation mechanism for controlling the pressure of the light-transmissive liquid FT to a predetermined pressure based on the pressure detected by the pressure sensor 37.

The pressurizing unit PU supplies the light-transmissive liquid FT from the liquid tank 27 to the ejection head 30 at a predetermined pressure. The pressurizing pump 38 applies one of a plurality of controlled pressures, which include at least a first pressure and a second pressure, to the light-transmissive liquid FT. The first pressure (lens formation pressure) causes the light-transmissive liquid FT to form a liquid lens LZ (refer to FIG. 7). The second pressure (ejection pressure) causes the light-transmissive liquid FT to be ejected or discharged from the ejection head 30.

Two guide rails 28, which extend along the X axis, are formed on the lower surface of the guide bridge 26. A carriage 29, which moves along the guide rails 28, is fixed to the guide rails 28. The carriage 29 has a screw shaft (drive shaft) that extends, for example, along the guide rail 28 in the X axis, and a linear-motion mechanism including a ball nut mated with the screw shaft. An X axis motor MX (refer to FIG. 9) formed by a stepping motor connected to the drive shaft is arranged on the carriage 29 or the guide bridge 26. The X axis motor MX generates forward or reverse rotation for a quantity of steps that is in accordance with a drive signal. The carriage 29 is moves along the X axis by a distance corresponding to the quantity of steps.

As shown in FIG. 5, the carriage 29 is moved between a first position (solid lines) near to the support leg 25a and a second position (broken lines) near the support leg 25b.

Figure 6:
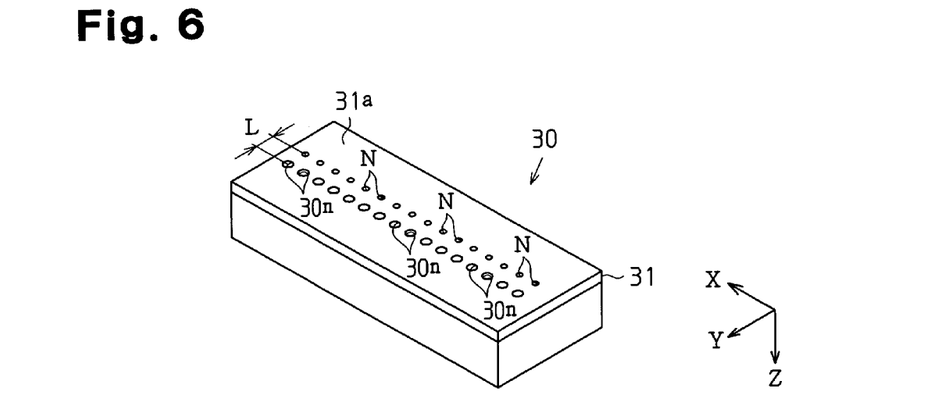
FIG. 6 is a perspective view showing an ejection head included in the droplet ejection apparatus shown in FIG. 5.

As shown in FIG. 5, the ejection head 30 for ejecting droplets Fb is arranged on the lower surface of the carriage 29. FIG. 6 shows the lower surface (nozzle surface 31a) of the ejection head 30.

The ejection head 30 includes a nozzle plate 31. The nozzle surface 31a is defined by the lower surface of the nozzle plate 31. The nozzle surface 31a has sixteen ejection nozzles N for ejecting the fine droplets Fb (refer to FIG. 7). The ejection nozzles N are arranged in a line at regular intervals in the X arrow direction (row direction of the cells C).

Each ejection nozzle N is a circular hole having a diameter of 25 μm. The pitch of the ejection nozzles N is equal to the pitch of the cells C (140 μm). The ejection nozzles N are formed as through holes that extend in the normal direction relative to the substrate 2 (Z arrow direction) that is placed on the support surface 24. The ejection nozzles N face the cells C that are arranged in the column direction when the substrate 2 (code formation region S) reciprocates linearly in the Y arrow direction.

Sixteen apertures 30n corresponding to the sixteen ejection nozzles N are arranged in a line at regular intervals in the X arrow direction. The line of apertures 30n is spaced from the line of ejection nozzles N in the Y arrow direction. As shown in FIG. 6, the center of each aperture 30n is spaced from the center of the corresponding ejection nozzle N by a distance L. Hereafter, the distance L is referred to as a moving distance L. Each aperture 30n has a diameter greater than the diameter of the ejection nozzle N. In one example, each aperture 30n is a circular hole having a diameter of 120 μm. The apertures 30n face the cells C arranged in the column direction when the code formation region S reciprocates linearly in the Y arrow direction. The inner surface of each aperture 30n repels the light-transmissive liquid FT.

The structure of the ejection head 30 will now be described with reference to FIGS. 7 and 8.

Figure 7:
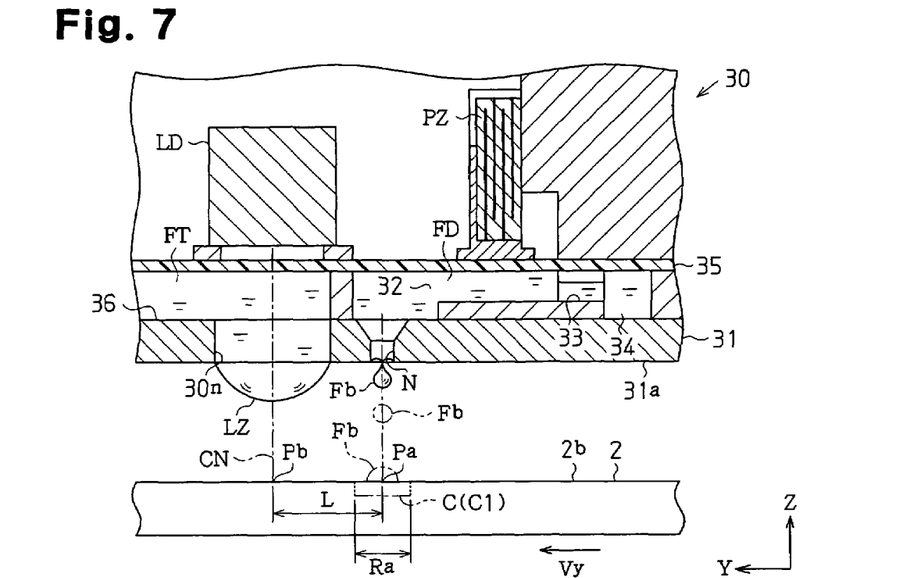
FIGS. 7 and 8 are partial cross-sectional views of the ejection head shown in FIG. 6.

As shown in FIG. 7, a plurality of cavities 32, which function as pressurizing chambers, are formed at positions above the nozzle plate 31 in the Z arrow direction of the ejection nozzles Z. The functional liquid FD in the liquid tank 27 is supplied from a common supply passage 34 to the cavities 32 via a plurality of connecting holes 33. The functional liquid FD introduced in each cavity 32 is ejected from the corresponding ejection nozzle N.

At a position above the cavities 32, a diaphragm 35 covers the entire surface of the nozzle plate 31. The diaphragm 35 vibrates in the direction of the Z axis and changes the capacity of the cavities 32. The diaphragm 35 is a film that transmits the laser beam B. A preferable film for the diaphragm 35 may be, for example, a polyphenylene sulfide (PPS) film having a thickness of about 2 μm.

Sixteen piezoelectric elements PZ are arranged above the diaphragm 35 at positions corresponding to the ejection nozzles N. Each piezoelectric element PZ contracts and expands in response to a piezoelectric element drive signal VDP for driving the piezoelectric element PZ and vibrates the diaphragm 35 relative to the Z axis. When the piezoelectric element PZ contracts and expands, the capacity of the cavity 32 increases and decreases. This structure enables the fine droplet Fb of the functional liquid FD having a volume that is in accordance with the amount by which the piezoelectric element PZ is moved to be ejected from the corresponding ejection nozzle N. In the preferred embodiment, the movement of each piezoelectric element PZ enables ejection of the fine droplet Fb, the diameter of which is substantially half of the target dot diameter Ra.

Hereafter, the position at which the fine droplet Fb is deposited, that is, the point on the substrate 2 that is immediately below the ejection nozzle N in FIG. 7, is referred to as a deposit position Pa.

As shown in FIG. 7, a light-transmissive liquid passage 36 is defined above the nozzle plate 31 in correspondence with each aperture 30n. Each light-transmissive liquid passage 36 communicates with the liquid tank 27 and the corresponding aperture 30n. Each light-transmissive liquid passage 36 supplies some of the light-transmissive liquid FT stored in the liquid tank 27 to the corresponding aperture 30n.

As shown in FIG. 7, when the lens formation pressure causes the light-transmissive liquid FT to be supplied to the light-transmissive liquid passage 36, the outer surface (meniscus) of the light-transmissive liquid FT that fills the aperture 30n projects from the nozzle surface 31a due to surface tension. As a result, a semicircular liquid lens LZ is formed at the aperture 30n. The optical axis of the liquid lens LZ coincides with the center axis CN of the aperture 30n.

Figure 8:
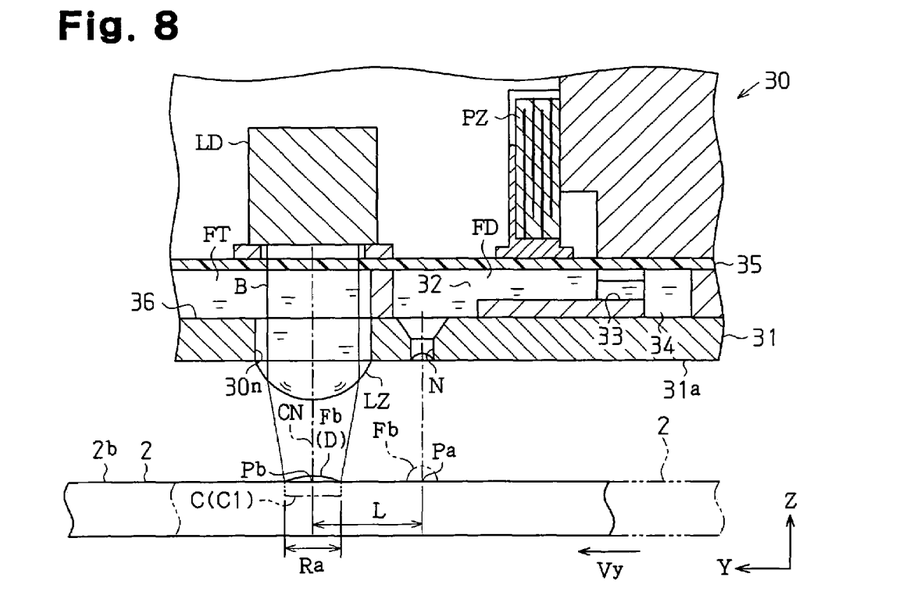

As shown in FIG. 8, the liquid lens LZ focuses the laser beam B, and forms a predetermined beam profile, for example, a circular beam profile, at the irradiation position Pb on the rear surface 2b that is immediately below the aperture 30n. The lens coefficient of the liquid lens LZ is determined in a manner that the blot (dot D) of the fine droplet Fb moved to the position immediately below the aperture 30n falls within the focal depth range of the liquid lens LZ. It is preferable that the lens coefficient of the liquid lens LZ be set in a manner that the beam diameter at the rear surface 2b coincides with the target dot diameter Ra. The aperture 30n serves as a liquid lens holder that functions as an outlet of the laser beam B as well as an outlet of the light-transmissive liquid FT.

When the ejection pressure causes the light-transmissive liquid FT to be supplied to the light-transmissive liquid passage 36, the meniscus of the liquid at the aperture 30n projects more downward than the liquid lens LZ so that a portion of the projecting light-transmissive liquid FT is ejected as a droplet. The ejection of the light-transmissive liquid FT is repeated at a predetermined frequency (e.g., whenever the nozzle surface 31a is cleaned) to maintain the optical properties of the liquid lens LZ.

An intersection point of the optical axis (central axis CN) of the liquid lens LZ and the substrate 2 is referred to as the irradiation position Pb. The distance L between the irradiation position Pb and the deposit position Pa is determined in the manner described below.

First, the fine droplet Fb ejected from each ejection nozzle N is observed using an ultrahigh-speed camera. The time (target irradiation time Ta) required for the diameter of the fine droplet Fb to reach the target dot diameter Ra after the fine droplet Fb is deposited on the substrate 2 is measured. The target irradiation time Ta is the time required for the diameter of the deposited fine droplet Fb to reach the target dot diameter Ra. The distance L is the distance by which the fine droplet Fb deposited at the deposit position Pa is moved at the droplet transfer velocity Vy during the target irradiation time Ta. The distance L is obtained by multiplying the target irradiation time Ta by the droplet transfer velocity Vy. In one example, the target irradiation time Ta is 500 microseconds, the droplet transfer velocity Vy is 200 millimeters per seconds, and the distance L is 100 micrometers.

As shown in FIG. 8, semiconductor laser arrays LD, which functions as a laser source, are arranged above the diaphragm 35 immediately above the corresponding apertures 30n (liquid lens LZ). When a semiconductor laser array LD (laser drive voltage VDL) receives a drive signal, the semiconductor laser array LD emits a laser beam B having a predetermined wavelength (e.g., 800 nm) toward the diaphragm 35. The emitted laser beam B is guided to the corresponding aperture 30n (liquid lens LZ) via the diaphragm 35 and the corresponding light-transmissive liquid passage 36 (light-transmissive liquid FT).

The output value of the laser beam B is set in a manner that the laser beam B has energy that subtly increase the temperature of the light-transmissive liquid FT in the light-transmissive liquid passage 36 and the aperture 30n. Further, the output value of the laser beam B is set so that it dries the dispersion medium and sinters the metal particles contained in the fine droplet Fb (functional liquid FD) in the focal depth range.

When the fine droplet Fb at the irradiation position Pb is irradiated with the laser beam B that is focused by the liquid lens LZ, the fine droplet Fb is dried and sintered. This forms the dot D having the target dot diameter Ra.

The electric configuration of the droplet ejection apparatus 20 will now be described with reference to FIG. 9.

As shown in FIG. 9, a controller 40 includes an interface (I/F) 42, a control unit 43, a RAM 44, and a ROM 45. The I/F 42 receives various data from an input device 41, such as an external computer. The control unit 43 is formed by a CPU etc. The RAM 44 includes a DRAM and an SRAM, and stores various data. The ROM 45 stores various control programs. The controller 40 includes a drive waveform generation circuit 46, an oscillation circuit 47, a power supply circuit 48, and an I/F 49. The oscillation circuit 47 generates a clock signal CLK for synchronizing various drive signals. The power supply circuit 48 generates a laser drive voltage VDL for driving each semiconductor laser array LD. The I/F 49 transmits various drive signals. In the controller 40, the I/F 42, the control unit 43, the RAM 44, the ROM 45, the drive waveform generation circuit 46, the oscillation circuit 47, the power supply circuit 48, and the I/F 49 are connected to one another by a bus 40a.

The I/F 42 receives pressure data Ia in a predetermined format from the input device 41. The pressure data Ia represents the pressure of the light-transmissive liquid FT for forming the liquid lens LZ (the lens formation voltage or the ejection voltage). Further, the I/F 42 receives velocity data Ib in a predetermined format from the input device 41. The velocity data Ib represents the droplet transfer velocity Vy of the movable stage 23. The I/F 42 also receives drawing data Ic in a predetermined format from the input device 41 as an image of the identification code 10. The identification code 10 is obtained by two-dimensionally coding identification data of the substrate 2, such as a product number or a lot number, using a known method.

The control unit 43 stores the pressure data Ia and the velocity data Ib received by the I/F 42 in the RAM 44. The control unit 43 executes an identification code generation operation based on the pressure data Ia, the velocity data Ib, and the drawing data Ic received by the I/F 42. More specifically, the control unit 43 uses the RAM 44 as a processing region to execute the operation of transferring the substrate 2 by moving the movable stage 23 in accordance with a control program (e.g., an identification code generation program), which is stored, for example, in the ROM 45, and execute the operation of ejecting droplets by driving each piezoelectric element PZ of the ejection head 30. The control unit 43 dries and sinters the fine droplets Fb ejected by driving each semiconductor laser array LD in accordance with the identification code generation program.

In detail, the control unit 43 expands the drawing data Ic received by the I/F 42 and generates bitmap data BMD, which indicates whether the fine droplet Fb is to be ejected to each cell C on a two-dimensional drawing plane (code formation region S). The control unit 43 stores the generated bitmap data BMD in the RAM 44. The bitmap data BMD is serial data having a bit length of 16 by 16 bits in correspondence with the piezoelectric elements PZ. The bitmap data BMD is used to determine whether each piezoelectric element PZ is to be turned on or off in accordance with the value of each bit (0 or 1).

The control unit 43 subjects the drawing data Ic to an expansion process, which differs from the expansion process of the bitmap data BMD, to generate waveform data of a piezoelectric element drive signal VDP, which is provided to each piezoelectric element PZ. The control unit 43 then provides the piezoelectric element drive signal VDP to the drive waveform generation circuit 46. The drive waveform generation circuit 46 includes a waveform memory 46a, a D/A converter 46b, and a signal amplifier 46c. The waveform memory 46a stores waveform data generated by the control unit 43. The D/A converter 46b performs digital-to-analog conversion of the waveform data to generate an analog signal, and outputs the generated analog signal. The signal amplifier 46c amplifies the analog waveform signal output from the D/A converter 46b. The drive waveform generation circuit 46 performs digital-to-analog conversion of the waveform data stored in the waveform memory 46a with the D/A converter 46b and amplifies the analog waveform signal with the signal amplifier 46c to generate the piezoelectric drive signal VDP.

The control unit 43 serially transfers, as an ejection control signal SI synchronized with a clock signal CLK generated by the oscillation circuit 47, the bitmap data BMD to a head drive circuit 51 (shift register 56) via the I/F 49. Further, the control unit 43 provides a latch signal LAT for latching the transferred ejection control signal SI to the head drive circuit 51. The control unit 43 also provides the piezoelectric element drive signal VDP to the head drive circuit 51 (switch circuit 59) in synchronization with the clock signal CLK generated by the oscillation circuit 47.

A pressurizing pump drive circuit 50 is connected to the controller 40 via the I/F 49. The pressure sensor 37 is connected to the controller 40 via the pressurizing pump drive circuit 50. The controller 40 refers to the pressure data Ia stored in the RAM 44 and the detection signal detected by the pressure sensor 37 and provides the pressurizing pump drive circuit 50 with a pump drive control signal. The pressurizing pump drive circuit 50 drives the pressurizing pump 38 in response to the pump drive control signal from the controller 40 to control the pressure of the light-transmissive liquid FT at the lens formation pressure (or the ejection pressure).

The head drive circuit 51 is connected to the controller 40 via the I/F 49. The head drive circuit 51 includes a shift register 56, a latch circuit 57, a level shifter 58, and a switch circuit 59. The shift register 56 performs serial-to-parallel conversion of the ejection control signal SI that is transferred by the controller 40 (control unit 43) in synchronization with the clock signal CLK. The shift register 56 performs the conversion of the ejection control signal SI for the 16 piezoelectric elements PZ (PZ1 to PZ16). The latch circuit 57 latches the 16-bit ejection control signal SI, which is converted by the shift register 56 into parallel data, in synchronization with the latch signal LAT input from the controller 40 (control unit 43), and provides the latched ejection control signal SI to the level shifter 58 and a laser drive circuit 52. The level shifter 58 increases the voltage of the ejection control signal SI latched by the latch circuit 57 to the voltage at which the switch circuit 59 is driven. Further, the level shifter 58 generates open/close signals GS1 corresponding to the 16 piezoelectric elements PZ. The switch circuit 59 includes switch elements Sa1 to Sa16 relatively corresponding to the piezoelectric elements PZ. A common piezoelectric element drive signal VDP is input into the switch elements Sa1 to Sa16. Each of the switch elements Sa1 to Sa16 is connected to the corresponding one of the piezoelectric elements PZ (PZ1 to PZ16). The corresponding open/close signal GS1 is input into each of the switch elements Sa1 to Sa16 from the level shifter 58. The open/close signal GS1 controls whether the piezoelectric drive signal VDP is to be provided to the piezoelectric element PZ.

More specifically, in the droplet ejection apparatus 20, the piezoelectric element drive signal VDP generated by the drive waveform generation circuit 46 is applied commonly to the piezoelectric elements PZ via the corresponding switch elements Sa1 to Sa16, and the switch elements Sa1 to Sa16 are opened or closed in accordance with the ejection control signal SI (open/close signals GS1) provided from the controller 40 (control unit 43). When the switch elements Sa1 to Sa16 are closed, the piezoelectric elements PZ1 to PZ16 corresponding to the switch elements Sa1 to Sa16 are provided with the piezoelectric element drive signal VDP. As a result, the fine droplets Fb are ejected from the nozzles N corresponding to the piezoelectric elements PZ.

Figure 10:
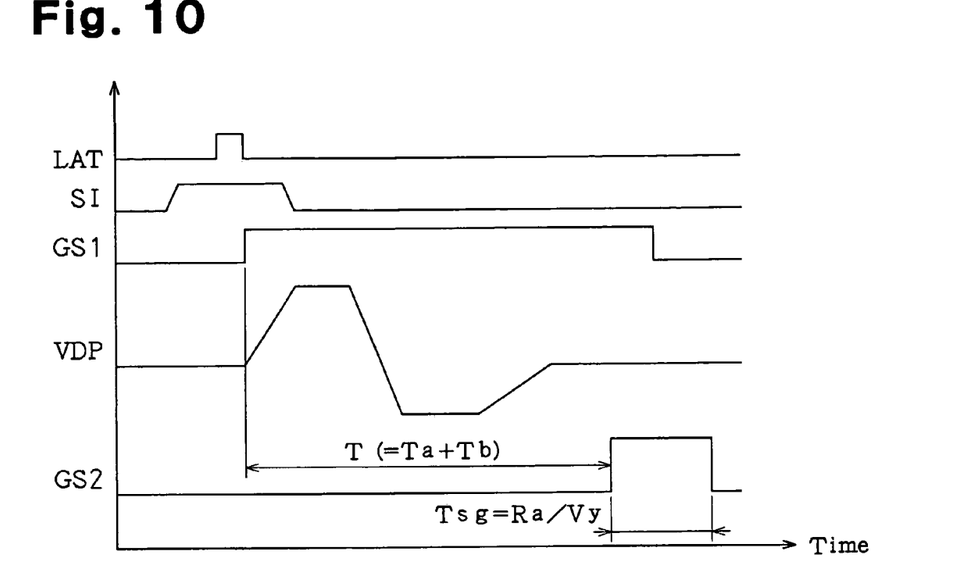
FIG. 10 is a timing chart describing the drive timing of the ejection head shown in FIG. 5.

FIG. 10 shows the pulse waveforms of the latch signal LAT, the ejection control signal SI, and the open/close signal GS1, and the waveform of the piezoelectric element drive signal VDP applied to the piezoelectric element PZ in response to the open/close signal GS1.

As shown in FIG. 10, when the latch signal LAT input into the head drive circuit 51 falls, the open/close signal GS1 is generated based on the ejection control signal SI corresponding to 16 bits. When the open/close signal GS1 rises, the piezoelectric element drive signal VDP is provided to the corresponding piezoelectric element PZ. The piezoelectric element PZ contracts as the voltage value of the piezoelectric element drive signal VDP increases so that the functional liquid FD is drawn into the cavity 32. The piezoelectric element PZ expands as the voltage value of the piezoelectric element drive signal VDP decreases so that the functional liquid FD in the cavity 32 is forced out, that is, the fine droplet Fb is ejected. When the fine droplet Fb is ejected, the voltage value of the piezoelectric element signal VDP returns to its initial voltage. This completes the operation of ejecting the fine droplet Fb performed by driving the piezoelectric element PZ.

The laser drive circuit 52 is connected to the controller 40 via the I/F 49. The laser drive circuit 52 includes a delay pulse generation circuit 61 and a switch circuit 62. The delay pulse generation circuit 61 generates a pulse signal (open/close signal GS2) that is obtained by delaying the ejection control signal SI latched by the latch circuit 57 by a predetermined time (wait time T) and provides the open/close signal GS2 to the switch circuit 62.

The wait time T will now be described. The wait time T is set as the time obtained by adding the target irradiation time Ta (Ta=L/Vy=500 microseconds) to the time (ejection time Tb) required from when the piezoelectric element PZ starts deforming (when the open/close signal GS1 rises) to when the fine droplet Fb is deposited (wait time T=Ta+Tb). In other words, the wait time T is set as the time required by the diameter of the fine droplet Fb to reach the target dot diameter Ra after the piezoelectric element PZ starts deforming.

Thus, the laser drive circuit 52 provides the switch circuit 62 with the open/close signal GS2 when the diameter of the fine droplet Fb reaches the target dot diameter Ra.

The switch circuit 62 includes switch elements Sb1 to Sb16 respectively corresponding to the semiconductor laser arrays LD. The common laser drive voltage VDL generated by the power supply circuit 48 is input to the input sides of the switch elements Sb1 to Sb16. The output sides of the switch elements Sb1 to Sb16 are connected to the corresponding semiconductor laser arrays LD (LD1 to LD16). The corresponding open/close signal GS2 is input into each of the switch elements Sb1 to Sb16 from the delay pulse generation circuit 61. The open/close signal GS2 controls whether the laser drive voltage VDL is to be supplied to the semiconductor laser array LD.

In the droplet ejection apparatus 20, the laser drive voltage VDL generated by the power supply circuit 48 is commonly applied to the semiconductor laser arrays LD via the corresponding switch elements Sb1 to Sb16, and the switch elements Sb1 to Sb16 are opened or closed in accordance with the ejection control signal SI (open/close signal GS2) provided from the controller 40 (control unit 43). When the switch elements Sb1 to Sb16 are closed, the laser drive voltage VDL is provided to the semiconductor laser arrays LD1 to LD16 corresponding to the switch elements Sb1 to Sb16. The laser beams B are emitted from the corresponding semiconductor laser arrays LD.

Thus, the laser drive circuit 52 closes the corresponding switch elements Sb1 to Sb16 when the diameter of the fine droplets Fb reaches the target dot diameter Ra, and emits the laser beams B from the corresponding semiconductor laser arrays LD1 to LD16.

The delay pulse generation circuit 61 sets the pulse time width of the open/close signal GS2 as the time required by one cell C to transmit the laser beam B (beam diameter) (pulse time width Tsg=Ra/Vy).

As shown in FIG. 10, the open/close signal GS2 rises when the wait time T elapses after the latch signal LAT is input to the head drive circuit 51 so that the laser drive voltage VDL is applied to the corresponding semiconductor laser array LD. As a result, the laser beam B is emitted from the corresponding semiconductor laser array LD to irradiate the fine droplet Fb for the pulse time width Tsg of the open/close signal GS2. During the irradiation, the fine droplet Fb having the target dot diameter Ra transmits the laser beam B focused by the liquid lens LZ. When the open/close signal GS2 falls, the application of the laser drive voltage VDL is stopped. This completes the drying and sintering of the fine droplet Fb that is performed using the semiconductor laser array LD.

A substrate detector 53 is connected to the controller 40 via the I/F 49. The substrate detector 53 detects the edge of the substrate 2. The substrate detector 53 is used by the controller 40 to calculate the position of the substrate 2 passing immediately below the ejection head 30 (nozzles N).

An X axis motor drive circuit 54 is connected to the controller 40 via the I/F 49. The controller 40 provides the X axis motor drive circuit 54 with an X axis motor drive control signal. The X axis motor drive circuit 54 generates rotation with the X axis motor MX and reciprocates the carriage 29 in response to the X axis motor drive control signal provided from the controller 40. The carriage 29 moves along the X axis in accordance with the direction of the rotation generated by the X axis motor MX.

An X axis motor rotation detector 54a is connected to the controller 40 via the X axis motor drive circuit 54. A detection signal from the X axis motor rotation detector 54a is input to the controller 40. The controller 40 detects the direction and amount of the rotation generated by the X axis motor MX based on the detection signal, and calculates the movement amount and the movement direction of the ejection head 30 (carriage 29) in the X arrow direction.

A Y axis motor drive circuit 55 is connected to the controller 40 via the I/F 49. The controller 40 refers to the velocity data Ib stored in the RAM 44, and provides the Y axis motor drive circuit 55 with a Y axis motor drive control signal. The Y axis motor drive circuit 55 generates rotation with the Y axis motor MY and reciprocates the movable stage 23 in response to the Y axis motor drive control signal provided from the controller 40. The movable stage 23 (deposited fine droplet Fb) moves at the droplet transfer velocity Vy (e.g., 200 millimeters per seconds). For example, when the Y axis motor MY generates rotation in the forward direction, the movable stage 23 (substrate 2) moves in the Y arrow direction at the droplet transfer velocity Vy. When the Y axis motor MY generates rotation in the reverse direction, the movable stage 23 (substrate 2) moves in the direction opposite to the Y arrow direction at the droplet transfer velocity Vy.

A Y axis motor rotation detector 55a is connected to the controller 40 via the Y axis motor drive circuit 55. A detection signal from the Y axis motor rotation detector 55a is input to the controller 40. The controller 40 detects the rotation direction and the rotation amount of the Y axis motor MY based on the detection signal from the Y axis motor rotation detector 55a, and calculates the movement direction and the movement amount of the substrate 2 with respect to the ejection head 30 in the Y arrow direction.

The method for forming the identification code 10 on the rear surface 2b of the substrate 2 using the droplet ejection apparatus 20 will now be described.

First, as shown in FIG. 5, the substrate 2 is arranged and fixed on the movable stage 23 at the first position with the rear surface 2b of the substrate 2 facing an upward direction. In this state, one side of the substrate 2 in the Y arrow direction is positioned in the direction opposite to the Y arrow direction with respect to the guide bridge 26.

In this state, the controller 40 drives the X axis motor MX and moves the carriage 29 (ejection head 30) in the X arrow direction away from the first position. The carriage 29 is set in a manner that the corresponding cells C pass immediately below the ejection nozzles N (apertures 30n) when the substrate 2 is moved in the Y arrow direction. The controller 40 then drives the pressurizing pump 38 and sets the pressure of the light-transmissive liquid FT to the lens formation pressure. The predetermined liquid lens LZ is formed at each aperture 30n.

In this state, the controller 40 drives the Y axis motor MY and moves the substrate 2 at the droplet transfer velocity Vy (e.g., 200 millimeters per seconds) in the Y arrow direction with the movable stage 23. When the substrate detector 53 detects the edge of the substrate 2 in the Y arrow direction, the controller 40 calculates whether the cells C (black cells C1) on the first row have been moved to the deposit positions Pa based on the detection signal from the Y axis motor rotation detector 55a.

During this operation, the controller 40 provides the ejection control signal SI based on the bitmap data BMD stored in the RAM 44 and the piezoelectric drive signal VDP generated by the drive waveform generation circuit 46 to the head drive circuit 51 in accordance with the code generation program. The controller 40 provides the laser drive voltage VDL generated by the power supply circuit 48 to the laser drive circuit 52. The controller 40 waits until the timing for outputting the latch signal LAT arrives.

When the cells C (black cells C1) in the first row have been moved to the deposit positions Pa, the controller 40 provides the latch signal LAT to the head drive circuit 51.

When receiving the latch signal LAT from the controller 40, the head drive circuit 51 generates the open/close signal GS1 based on the ejection control signal SI and provides the open/close signal GS1 to the switch circuit 59. The piezoelectric drive signal VDP is provided to the piezoelectric elements PZ corresponding to the closed ones of the switch elements Sa1 to Sa16 so that the fine droplets Fb that are in accordance with the piezoelectric element drive signal VDP are simultaneously from the corresponding nozzles N as shown in FIG. 7.

When the ejection time Tb elapses after the open/close signal GS1 rises (the piezoelectric elements PZ start moving), the ejected fine droplets Fb are simultaneously deposited on the deposit positions Pa (black cells C1).

When the head drive circuit 51 receives the latch signal LAT, the laser drive circuit 52 (delay pulse generation circuit 61) receives the ejection control signal SI latched by the latch circuit 57 and starts generating the open/close signal GS2. The laser drive circuit 52 waits until the timing for providing the open/close signal GS2 to the switch circuit 62 arrives.

During this operation, the controller 40 moves the substrate 2 in the Y arrow direction and the deposited fine droplets Fb toward the irradiation positions Pb at the droplet transfer velocity Vy (e.g., 200 millimeters per seconds).

When the target irradiation time Ta (Ta=L/Vy=500 microseconds) elapses after the fine droplets Fb are deposited, or when the wait time T (T=Ta+Tb) elapses after the piezoelectric elements PZ start deforming, the fine droplets Fb at the deposit positions Pa, each of which has spread to have the target dot diameter Ra, reach the irradiation positions Pb as shown in FIG. 8.

In this state, the laser drive circuit 52 provides the open/close signal GS2 generated by the delay pulse generation circuit 61 to the switch circuit 62 and supplies the laser drive voltage VDL to the semiconductor laser arrays LD corresponding to the closed ones of the switch elements Sb1 to Sb16. More specifically, the laser drive circuit 52 simultaneously emits the laser beams B from the corresponding semiconductor laser arrays LD. The emitted laser beams B are focused by the liquid lenses LZ formed at the apertures 30n and simultaneously irradiate the fine droplets Fb, each having the target dot diameter Ra.

As a result, the fine droplets Fb deposited within the black cells C1 on the first row are simultaneously irradiated with the focused laser beams B when the diameter of the fine droplets Fb reaches the target dot diameter Ra. The dispersion medium contained in each fine droplet Fb irradiated with the laser beam B evaporates, and the metal particles contained in each fine droplet Fb are sintered. As a result, each dot D having the target dot diameter Ra, which is in accordance with the cell C (black cell C1), is formed.

Subsequently, in the same manner, the controller 40 moves the substrate 2 at the droplet transfer velocity Vy, and simultaneously ejects the fine droplets Fb from the nozzles N corresponding to the black cells C1 whenever the cells C of each row reach the deposit positions Pa. When the target irradiation time Ta elapses after the fine droplets Fb are deposited, the fine droplets Fb are simultaneously irradiated with the laser beams B.

When the formation of the dots D of the identification code 10 in the code formation region S is completed, the controller 40 controls the Y axis motor MY to move the substrate 2 away from the position below the ejection head 30.

The preferred embodiment has the advantages described below.

(1) The moving distance L is determined based on the time (target irradiation time Ta) required by the diameter of the deposited fine droplet Fb to reach the target dot diameter Ra and the velocity at which the movable stage 23 is moved (the conveying velocity Vy). The aperture 30n is formed at a position spaced from the ejection nozzle N by the distance equal to the moving distance L.

When the diameter of the fine droplet Fb reaches the target dot diameter Ra, the fine droplet Fb is irradiated with the laser beam B. This prevents excessive spreading of the fine droplet Fb and enables the outer diameter of the dot D to be controlled to the target dot diameter Ra.

Further, the laser beam B is emitted through the aperture 30n that is aligned with the ejection nozzle N. This structure prevents the laser beam B from irradiating a position differing from the intended irradiation position. Thus, the fine droplet Fb is irradiated by the laser beam B with high accuracy.

The irradiation timing of the laser beam B is expedited, and the accuracy of the irradiation position of the laser beam B is improved. This controls the dot D to be the desired size, that is, the target dot diameter Ra.

(2) The light-transmissive liquid FT that can be ejected is supplied into the aperture 30n, and the laser beam B is emitted through the light-transmissive liquid FT. The ejection of the light-transmissive liquid FT maintains the optical properties of the optical path of the laser beam B. As a result, the laser beam B is emitted in a stable manner. This stably controls the outer diameter of the dot D at the target dot diameter Ra.

The liquid lens LZ projects from the aperture 30n toward the substrate 2. The liquid lens LZ, which is arranged near the substrate 2, focuses the laser beam B. This improves the intensity of the laser beam B that irradiates the fine droplet Fb.

(3) The liquid lens LZ is formed in a manner that the fine droplet Fb at the irradiation position Pb falls within the range of the focal depth of the liquid lens LZ. The fine droplet Fb is irradiated with the laser beam B that has been focused to increase intensity. As a result, the droplet Fb is instantaneously dried. Further, the optical system (the aperture 30n and the passage 36) is prevented from being contaminated by the splattering of the fine droplet Fb. This enables the fine droplet Fb to be constantly and stably irradiated by the laser beam B with improved intensity.

(4) The light-transmissive liquid FT is the cleaning liquid for the ejection head 30. The cleaning liquid is supplied from the vicinity of the ejection nozzles N so that the ejection nozzles N are effectively cleaned. This structure prevents the shape or the size of the fine droplet Fb from varying and enables the size of the dot D to be controlled with high accuracy.

(5) The laser beam B has a circular beam profile with an inner diameter equal to the target dot diameter Ra at the irradiation position Pb. As a result, the fine droplet Fb having the target dot diameter Ra is irradiated uniformly with the laser beam B. This enables the size of the dot D to be controlled with high accuracy.

(6) The semiconductor laser arrays LD are arranged in the ejection head 30. This simplifies the mechanical structure of the droplet ejection apparatus 20 as compared with the structure in which an additional laser source is arranged external to the ejection head 30.

(7) The open/close signals GS1 for the switch elements Sa1 to Sa16 and the open/close signals GS2 for the switch elements Sb1 to Sb16 are generated based on the ejection control signal SI. The open/close signal GS2 rises when the wait time T elapses after the open/close signal GS1 rises. This ensures that the laser beams B are emitted whenever the fine droplets Fb are ejected and ensures that the diameter of each dot D is controlled to be equal to the target dot diameter Ra.

It should be apparent to those skilled in the art that the present invention may be embodied in many other specific forms without departing from the spirit or scope of the invention. Particularly, it should be understood that the present invention may be embodied in the following forms.

The light-transmissive liquid FT is not limited to the cleaning liquid for the ejection head 30. The light-transmissive liquid FT may be, for example, a dispersion medium or a prime solvent of the functional liquid FD that transmits the laser beam B.

The aperture 30n does not have to be a circular aperture and may be, for example, an elliptic aperture. When the aperture 30n is elliptic, the laser beam B produces a substantially elliptic beam profile around the irradiation position Pb. In this case, the long axis of the beam profile in the transfer direction (Y arrow direction) in which the fine droplet Fb is transferred enables the fine droplet Fb to be irradiated for a long time by the laser beam B.

The shape of the aperture 30n and the shape and the refractive index of the liquid lens LZ may be changed in accordance with the intensity distribution of the desired laser beam B. For example, the shape of the aperture 30n and the shape and the refractive index of the liquid lens LZ may be adjusted in a manner that the laser beam B is emitted so that an end of a substantially elliptic beam profile in the long axis direction has an intensity that dries the fine droplet Fb and a middle portion of the substantially elliptic beam profile of the laser beam B has an intensity that sinters the metal particles.

In this case, the laser beam for drying the fine droplet Fb and the laser beam for sintering the fine droplet Fb are sequentially emitted. This increases the kinds of materials that can be used as the fine droplet Fb.

Any pressurizing element that applies the lens formation pressure to the light-transmissive liquid FT may be used instead of the pressurizing pump 38 for pressurizing the light-transmissive liquid FT. For example, the piezoelectric element arranged on the diaphragm 35 on the light-transmissive liquid passage 36 may be used as the pressurizing element instead of the pressurizing pump 38. In this case, the light-transmissive liquid FT is pressurized by contracting and expanding the piezoelectric element.

The fine droplet Fb is deposited directly on the rear surface 2b. However, the present invention is not limited in such a manner. For example, a photothermal conversion material for absorbing the laser beam B and converting the laser beam B into heat may be applied to the rear surface 2b, and the fine droplet Fb may be deposited on the photothermal conversion material. In this case, the fine droplet Fb is dried using not only the optical energy of the laser beam B but also the thermal energy of the photothermal conversion material. This enables the size of the dot D to be controlled with higher accuracy.

In the preferred embodiment, the fine droplet Fb lyophilic to the rear surface 2b of the substrate 2 is ejected. However, the present invention is not limited in this manner. For example, the fine droplet Fb repellent to the rear surface 2b of the substrate 2 may be ejected, or a substrate repellent to the fine droplet Fb may be used as the substrate 2.

The fine droplet Fb that spreads into a semispherical shape on the substrate 2 is irradiated with the laser beam B to form the dot D. However, the present invention is not limited in such a manner. For example, the fine droplet Fb that permeates through a porous substrate (e.g., a ceramic multilayer board or a green sheet etc.) may be irradiated with the laser beam B to form a metal wiring pattern etc.

The open/close signal GS2 is generated based on the ejection control signal SI. However, the present invention is not limited in such a manner. For example, the open/close signal GS2 may be generated based on, for example, a detection signal of the substrate detector 53 or a detection signal of the Y axis motor rotation detector 55a. It is only required that the laser beam B be applied at a timing when the fine droplet Fb reaches the irradiation position Pb.

The laser source is not limited to the semiconductor laser array LD. Other laser sources such as a $CO_2$ laser device or a YAG laser device may be used. It is only required that the laser source output the laser beam B having an optical energy that dries the fine droplet Fb.

The laser source is formed by the semiconductor laser arrays LD, the quantity of which corresponds to the quantity of the ejection nozzles N. However, the present invention is not limited in such a manner. For example, a single laser beam B emitted from a laser beam source may be split into sixteen beams using a branch element such as a diffractive element.

The irradiation of the laser beam B is controlled by opening and closing the switch elements Sb1 to Sb16 corresponding to the semiconductor laser arrays LD. However, the present invention is not limited in such a manner. For example, a shutter may be arranged on the optical path of the laser beam B, and the irradiation of the laser beam B may be controlled by the timings at which the shutter is opened and closed.

The dot D may have a shape other than a semicircular shape. For example, the dot D may have an elliptic shape or may be linear so as to form a barcode.

The present invention is embodied in the pattern of the dots D. However, the present invention is not limited in such a manner. For example, the present invention may be embodied in the pattern of an orientation film or a color filter pattern included in, for example, the LCD module 1, or an insulation film pattern or a metal wiring pattern included in, for example, a semiconductor device. It is only required that the pattern be formed by drying the deposited fine droplets Fb using the laser beams B. In this case, the size of the pattern is also controlled to be of a desired size.

The substrate is embodied as the transparent glass substrate 2. However, the present invention is not limited in such a manner. For example, the substrate may be a silicon substrate, a flexible substrate, or a metal substrate.

The pressurizing unit is embodied as the piezoelectric element PZ. However, the pressurizing unit may use a means other than the piezoelectric element PZ to pressurize each pressure chamber (cavity 32). In this case, the size of the pattern is also controlled to be of a desired size.

The present invention is embodied as the droplet ejection apparatus 20 for forming the dot D. However, the present invention may be applied to a droplet ejection apparatus for forming, for example, the insulation film or the metal wiring. In this case, the size of the pattern is also controlled to be a predetermined size.

The dots D (identification code 10) are applied to the LCD module 1. However, the present invention is not limited in such a manner. For example, the dots D may be applied to a display module for an organic electroluminescence display device or to a display module for an electric field effect device (such as an FED (field-effect display) or an SED (surface-conduction electron-emitter display)) that uses light emission of a fluorescent substance caused by electrons emitted from a planar electron emission device included in the electric field effect device.

The present examples and embodiments are to be considered as illustrative and not restrictive, and the invention is not to be limited to the details given herein, but may be modified within the scope and equivalence of the appended claims.

What is claimed is:

1. A droplet ejection apparatus for ejecting a droplet toward a substrate, the droplet ejection apparatus comprising:
    a droplet ejection head facing towards the substrate and including a nozzle for ejecting the droplet;
    a laser source for generating a laser beam used to irradiate a blot of the droplet deposited on the substrate;
    an aperture formed adjacent to the nozzle in the droplet ejection head; and
    a passage, arranged in the droplet ejection head, for accommodating a light-transmissive liquid that transmits the laser beam and guides the laser beam to the aperture, wherein the light-transmissive liquid projects form the aperture to from a liquid lens at the aperture, and wherein the light-transmissive liquid is ejectable through the aperture.

2. The droplet ejection apparatus according to claim 1, wherein the light-transmissive liquid is compatible with the droplet.

3. The droplet ejection apparatus according to claim 1, wherein the light-transmissive liquid is a cleaning liquid for cleaning the nozzle.

4. The liquid ejection apparatus according to claim 1, wherein the passage includes a portion near the aperture that repels the light-transmissive liquid.

5. The droplet ejection apparatus according to claim 1, wherein the aperture is substantially circular.

6. The droplet ejection apparatus according to claim 1, wherein the aperture is substantially elliptic.

7. The liquid ejection apparatus according to claim 1, further comprising:
a lens formation mechanism for forming the liquid lens in the aperture by pressurizing the light-transmissive liquid, wherein the liquid lens focuses the laser beam on the blot of the droplet.

8. The droplet ejection apparatus according to claim 1, wherein the blot of the droplet has a diameter that changes as time elapses after the droplet is deposited on the substrate, the droplet ejection apparatus further comprising:
a conveying stage for conveying the substrate so that the blot faces the aperture when the diameter of the blot reaches a predetermined value.

9. A droplet ejection head for use with a substrate and a laser beam, the droplet ejection head comprising:
a nozzle for ejecting a droplet toward the substrate; and
an aperture arranged near the nozzle in which the laser beam is emitted through the aperture to dry a blot of the droplet deposited on the substrate, wherein the aperture is filled with a light-transmissive liquid the projects from the aperture to form a liquid lens at the aperture, and wherein the light-transmissive liquid is ejectable through the aperture.

10. The droplet ejection head according to claim 9, wherein the aperture retains the light-transmissive liquid that transmits the laser beam, and the laser beam is emitted from the head after being transmitted through the light-transmissive liquid in the aperture.

11. The droplet ejection head according to claim 10, wherein the light-transmissive liquid in the aperture forms the liquid lens for focusing the laser beam on the blot of the droplet deposited on the substrate.

12. The droplet ejection head according to claim 9, further comprising:
a laser source for generating the laser beam.

13. A droplet ejection apparatus for ejecting a droplet toward a substrate, the droplet ejection apparatus comprising:
a laser source for generating a laser beam;
a head having a surface facing the substrate, the surface including a nozzle for ejecting the droplet and a laser aperture aligned with the nozzle;
a passage, defined in the droplet ejection head in communication with the laser aperture, for supplying a light-transmissive liquid to the laser aperture;
wherein some of the light-transmissive liquid fills the laser aperture and projects from the laser aperture to form a liquid lens at the laser aperture, and the liquid lens focuses the laser beam on a blot of the droplet deposited on the substrate; and
a pump for applying controlled pressure to the light-transmissive liquid so that the light-transmissive liquid is discharged through the laser aperture.

14. The droplet ejection apparatus according to claim 13, wherein the light-transmissive liquid contains an element for cleaning the laser aperture.

15. The droplet ejection apparatus according to claim 13, wherein the laser aperture functions as a liquid lens holder and an outlet through which the light-transmissive liquid is discharged.

16. The droplet ejection apparatus according to claim 13, wherein the laser beam is emitted from the laser aperture after being transmitted through part of the passage.

* * * * *